US009897233B2

(12) United States Patent
Zhang

(10) Patent No.: US 9,897,233 B2
(45) Date of Patent: Feb. 20, 2018

(54) MICRO VALVE DEVICE AND VALVE BODY ASSEMBLY

(71) Applicant: Zhejiang Dunan Artificial Environment Co., Ltd., Hangzhou (CN)

(72) Inventor: Shengchang Zhang, Hangzhou (CN)

(73) Assignee: ZHEJIANG DUNAN ARTIFICIAL ENVIRONMENT CO., LTD., Hangzhou (CN)

( * ) Notice: Subject to any disclaimer, the term of this patent is extended or adjusted under 35 U.S.C. 154(b) by 134 days.

(21) Appl. No.: 14/748,981

(22) PCT Filed: Dec. 27, 2012

(86) PCT No.: PCT/CN2012/087709
§ 371 (c)(1),
(2) Date: Jun. 24, 2015

(87) PCT Pub. No.: WO2014/101057
PCT Pub. Date: Jul. 3, 2014

(65) Prior Publication Data
US 2016/0033055 A1 Feb. 4, 2016

(51) Int. Cl.
*F15B 13/04* (2006.01)
*F16K 99/00* (2006.01)

(52) U.S. Cl.
CPC ...... *F16K 99/0028* (2013.01); *F16K 99/0011* (2013.01); *F16K 99/0048* (2013.01); *F16K 99/0059* (2013.01)

(58) Field of Classification Search
CPC ............. F16K 99/0011; F16K 99/0028; F16K 99/0059; F16K 2099/008
(Continued)

(56) References Cited

U.S. PATENT DOCUMENTS 5,325,880 A * 7/1994 Johnson ............. F15C 3/04
137/1
5,709,245 A * 1/1998 Miller ............. F15B 13/0438
137/625.62
(Continued)

FOREIGN PATENT DOCUMENTS

CN 1942222 4/2007
CN 101617155 12/2009
(Continued)

OTHER PUBLICATIONS

International Preliminary Report on Patentability dated Jun. 30, 2015, by the International Bureau of WIPO and Written Opinion PCT/ISA/237.
(Continued)

*Primary Examiner* — Reinaldo Sanchez-Medina
(74) *Attorney, Agent, or Firm* — Dilworth & Barrese, LLP; Michael J. Musella, Esq.

(57) ABSTRACT

Provided are a micro valve device and a valve body assembly. The micro valve device comprises at least two control ports (402, 404) and at least two movable members (302), wherein the at least two movable members (302) respectively control each of the at least two control ports (402, 404) to realize that opening and closing of the control ports (402, 404) are independently controlled, so that the at least two control ports (402, 404) can output fluids with the same or different flow rate(s) or pressure(s). The valve body assembly comprises the micro valve device.

20 Claims, 4 Drawing Sheets

(58) Field of Classification Search
USPC .............. 137/596.14, 596.17, 625.25, 625.6,
137/625.64, 625.68; 251/25, 26, 31;
33/596.14, 596.17, 625.25, 625.6, 625.64,
33/625.68
See application file for complete search history.

(56) References Cited

U.S. PATENT DOCUMENTS

| | | | |
|---|---|---|---|
| 6,076,555 A | 6/2000 | Hettinger | |
| 6,283,440 B1 | 9/2001 | Evans | |
| 6,494,804 B1 | 12/2002 | Hunnicutt et al. | |
| 6,523,560 B1 | 2/2003 | Williams et al. | |
| 6,540,203 B1 | 4/2003 | Hunnicutt | |
| 6,761,420 B2 | 7/2004 | Maluf et al. | |
| 6,845,962 B1* | 1/2005 | Barron ................. | B60T 8/366 137/596.16 |
| 7,011,378 B2 | 3/2006 | Maluf et al. | |
| 8,082,952 B2* | 12/2011 | Veilleux ............. | F16K 11/0716 137/625.64 |
| 8,113,482 B2* | 2/2012 | Hunnicutt ........... | F16K 99/0001 137/625.25 |
| 8,851,117 B2* | 10/2014 | Xie ..................... | F16K 99/0011 137/625.25 |
| 2002/0100511 A1* | 8/2002 | Brocard ............. | F15B 13/0402 137/625.64 |
| 2003/0098612 A1* | 5/2003 | Maluf ................. | B81B 3/0024 303/119.1 |
| 2003/0116738 A1 | 6/2003 | O'Connor et al. | |
| 2010/0012195 A1 | 1/2010 | Hunnicutt | |
| 2013/0192704 A1 | 8/2013 | Xie | |

FOREIGN PATENT DOCUMENTS

| | | |
|---|---|---|
| CN | 101675280 | 3/2010 |
| CN | 102171134 | 8/2011 |
| JP | 2005207257 A | 8/2005 |

OTHER PUBLICATIONS

Notice of Allowance issued by the Japanese Patent Office in corresponding Japanese Patent Application No. 2015-549921 dated Oct. 18, 2016.

* cited by examiner (a)

(b)

MICRO VALVE DEVICE AND VALVE BODY ASSEMBLY

TECHNICAL FIELD

The present disclosure relates to a micro electromechanical system (MEMS), and more particularly, to a micro valve device and a valve body assembly based on a MEMS technology.

BACKGROUND

A micro valve device belongs to a key device in microfluidic control, and has important applications in fields such as biology, medical care and refrigeration. The micro valve device based on a micro-electromechanical system (MEMS) technology has advantages such as accurate control, low cost, mass production, good stability and reliability, etc.

In fluid control, the micro valve device may be used as a pilot valve for controlling a main valve, to achieve accurate control of an opening degree of the main valve, so as to reach a purpose of controlling fluid flow.

Chinese Patent Application No. 200580011090.3 and No. 200780046457.4, and U.S. Pat. Nos. 6,523,560, 7,011,378 and 6,761,420 disclose a micro valve device which can be used as a pilot valve, wherein only one fluid port is connected with a main valve. In a process that the pilot valve controls the main valve to achieve fluid control, a standard reference pressure must be provided, and opening and closing or a flow rate of a main fluid is controlled based on a relationship between a control port output pressure of the pilot valve and a standard reference pressure.

The standard reference pressure, as an absolute pressure value, is usually provided by an external of the micro valve device, for example, the standard reference pressure is often generated by using a mechanism such as a spring in an actual product. However, such a mechanism may cause phenomena such as aging and failure, so that deviation and even failure will occur to the standard reference pressure.

SUMMARY OF THE INVENTION

One objective of embodiments of the present disclosure is to provide an active micro valve device based on a MEMS technology, which can simultaneously output at least two types of fluids having different pressures or flow rates. The micro valve device can be used for controlling a pilot valve of a main valve, and the at least two types of fluids output by the pilot valve have a relative pressure difference, so that opening and closing or a flow proportion of the fluids passing through fluid channel of the main valve are accurately controllable, so as to achieve the purpose of controlling the flow rates.

One embodiment of the present disclosure provides a micro valve device, comprising: a main body, defining a chamber, the main body having a source port and at least two control ports which are in communication with the chamber; at least two movable members, the at least two movable members independently controlling conduction or blocking between each of the at least two control ports and the source port by switching between a first position and a second position, respectively, wherein upon each movable member being located in the first position, a corresponding control port is in fluid communication with the source port through at least a portion of the chamber, and upon each movable member being located in the second position, a fluid path between a corresponding control port and the source port is blocked by the movable member.

In one embodiment, the at least two control ports may output fluids having different flow rates and pressures, by independently controlling movement of each of the at least two movable members.

In one embodiment, the main body includes a base layer, an intermediate layer and a cover layer stacked sequentially, wherein the intermediate layer is of a frame structure, so as to define the chamber with the base layer and the cover layer.

In one embodiment, the main body further includes at least one back-flow port, and upon each of the two movable members being located in the second position, a corresponding control port is in fluid communication with the at least one back-flow port through at least a portion of the chamber.

In one embodiment, the source port and the control port are both located in the base layer.

In one embodiment, the back-flow port is located in the base layer.

In one embodiment, a thickness of the movable member along a direction perpendicular to a surface of the base layer or the cover layer is substantially the same as a thickness of the intermediate layer.

In one embodiment, the micro valve device further comprises an actuator for independently controlling each of the at least two movable members, so that each of the at least two movable members is located in the first position or the second position.

In one embodiment, one end of the actuator is fixed onto the intermediate layer, and the other end of the actuator is connected with the movable member, to drive the movable member to slide within the chamber along a direction parallel to the surface of the base layer or the cover layer.

In one embodiment, the actuator is a piezoelectric actuator including a plurality of film electrodes, the film electrodes being stacked along the direction parallel to the surface of the base layer or the cover layer.

In one embodiment, the movable member includes a first portion disposed between the control port and the back-flow port, for conducting or blocking fluid communication between the control port and the back-flow port; a second portion close to the source port, for conducting or blocking fluid communication between the control port and the source port; and a connecting portion for connecting two ends of the first portion and the second portion to constitute a frame form, and wherein the movable member of the frame form cooperates with the base layer and the cover layer so as to define a sub-chamber within the chamber.

In one embodiment, upon the movable member being located in the first position, the corresponding control port and the source port are located within a region corresponding to the sub-chamber, so that the control port is in fluid communication with the source port through the sub-chamber.

In one embodiment, on both sides of the back-flow port, there is a communicating recess on an inner surface of the cover layer; upon the movable member being located in the second position, the first portion of the movable member is located in a position corresponding to the communicating recess, and the control port is in fluid communication with the back-flow port through a gap between the first portion of the movable member and the communicating recess.

In one embodiment, each control port is configured with one source port, to form a source port/control port pair, wherein upon each movable member being located in the first position, the source port and the control port in the corresponding source port/control port pair are conducted therebetween; and upon each movable member being located in the second position, the source port and the control port in the corresponding source port/control port pair are blocked therebetween.

In one embodiment, there is a buffer recess on the inner surface of the cover layer, in a region corresponding to the source port.

In one embodiment, at least one of the cover layer and the base layer is tightly bonded to or integrally formed with the intermediate layer.

In one embodiment, the intermediate layer is made of a silicon material; and the cover layer and the base layer are made of the silicon material or borosilicate glass.

In one embodiment, the main body has two control ports.

Another embodiment of the present disclosure provides a valve body assembly, comprising: the micro valve device according to any one of the above embodiments; and a main valve, including a main body of the main valve and a valve core, the main body of the main valve having therein a main fluid channel running through the main body of the main valve along a first direction and a slide channel extending along a direction crossing the first direction, the valve core having therein a via hole running through the valve core along a direction parallel to the first direction, the valve core being placed in the slide channel of the main body, wherein one control port of the micro valve device is communicated with a first end of the slide channel, and the other control port in the micro valve device is communicated with a second end of the slide channel opposite to the first end, so as to drive the valve core to move in the slide channel.

In one embodiment, upon the valve core being driven so that the via hole is aligned with the main fluid channel, the main fluid channel is opened; and upon the valve core being driven so that the via hole and the main fluid channel are staggered, the main fluid channel is cut off.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Embodiment 1

Figure 1:
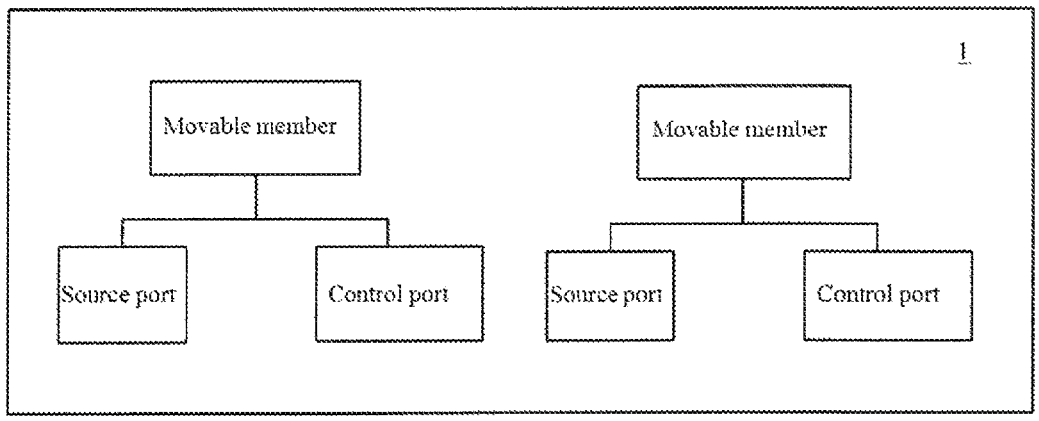
FIG. 1 is a schematic diagram illustrating a relationship between a movable member and a source port as well as a control port in a micro valve device according to an embodiment of the present disclosure.

The embodiment of the present disclosure provides a micro valve device, the micro valve device comprising a main body. The main body defines a chamber therein, and the main body includes a source port and at least two control ports. The source port and the control port can be communicated with the chamber. In addition, the micro valve device further comprises at least two movable members, and the at least two movable members respectively control a conducting state or a blocking state between each of the above-described at least two control ports and the source port correspondingly. Each movable member may be located in two positions, i.e., a first position and a second position. Upon each movable member being located in the first position, a corresponding control port may be in fluid communication with the source port through at least a portion of the chamber; and upon each movable member being located in the second position, a fluid path between the corresponding control port and the source port is blocked by the movable member. FIG. 1 illustrates a diagram of relationship among the movable member, the source port and the control port in the micro valve device 1. It can be seen from the diagram that, the conducting state and the blocking state between each control port and the source port are independently controlled by a corresponding movable member.

In one example, the main body of the micro valve device is formed by a base layer, an intermediate layer and a cover layer stacked sequentially. The intermediate layer is of a frame structure, so that it can cooperate with the base layer and the cover layer to define the above-described chamber within the main body of the micro valve device. The intermediate layer may closely cooperate with the base layer and/or the cover layer, or integrally formed with them. The control port and the source port may be disposed in the base layer, so as to achieve fluid communication with the chamber.

In one example, the micro valve device further comprises an actuator, and each movable member is driven by the actuator independently. Thus, in the micro valve device according to the embodiment of the present disclosure, the conducting state and the blocking state between each control port of the above-described at least two control ports and the source port can be independently controlled, whereby the fluids of the same or different flow rate(s) or pressure(s) can be output from the at least two control ports.

The actuator for driving the movable member in the micro valve device according to the embodiment of the present disclosure is not specifically limited, for example, the actuator may be a piezoelectric actuator, a thermal actuator, an electrostatic actuator, an electromagnetic actuator, or any other suitable type of actuator.

In one example, the actuator may drive each movable member to switch between the first position and the second position at a certain frequency. Upon each actuator being applied with different frequencies, the conducting state and the blocking state between each control port and the source port are switched at different frequencies, so the flow rates and the pressures of the fluids output by different control ports can be accurately controlled.

In addition, in the example illustrated in FIG. 1, each control port is configured with a source port. That is to say, the source port and the control port are disposed in one to one correspondence, so as to form at least two source port/control port pairs. The above-described movable member can independently control the conducting state and the blocking state between the source port and the control port in each source port/control port pair, so as to control the flow rates and the pressures of the fluids output by each control port. It should be noted that, although FIG. 1 illustrates a form that each control port is configured with a source port, yet the embodiment of the present disclosure is not limited thereto. A plurality of control ports can also share one or more source ports, as long as the conducting state and the blocking state between each control port and the source port can be independently controlled by the movable member.

For example, when the micro valve device is used, the source port of the micro valve device can be connected with a fluid source, and the control port of the micro valve device can be connected with an object that needs to have the fluid input or a control object (e.g., the main valve). When the movable member is controlled such that the source port and the control port are communicated by fluid therebetween, the fluid input by the source port can be output by the control port.

Figure 2:
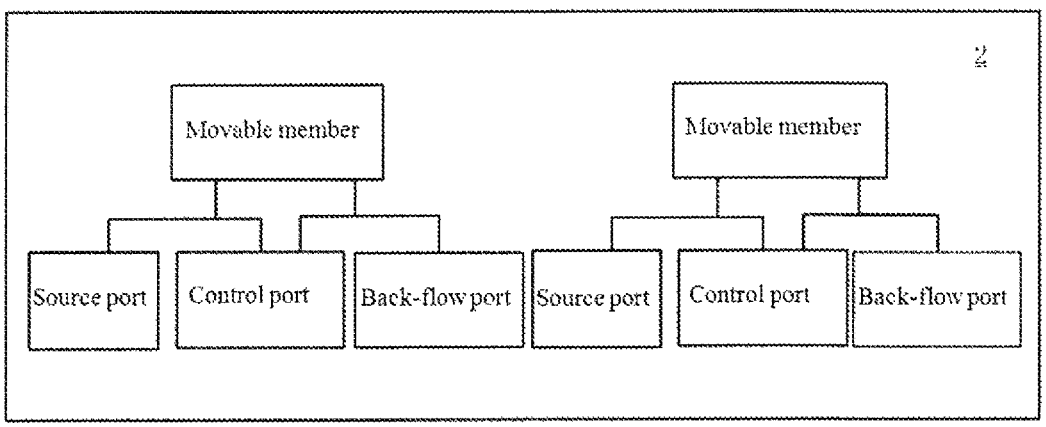
FIG. 2 is a schematic diagram illustrating a relationship between a movable member and a source port, a control port as well as a back-flow port in a micro valve device according to an embodiment of the present disclosure.

FIG. 2 illustrates a schematic diagram of another example according to the embodiment of the present disclosure. As can be seen in FIG. 2, the micro valve device 2 according to the embodiment of the present disclosure may further comprise a back-flow port, and the back-flow port may be communicated with the fluid source. The movable member not only can control the conducting state and the blocking state between the source port and the control port, but also can control the conducting state and the blocking state between the control port and the back-flow port. Specifically, when the movable member is located in the first position, the source port and the control port are conducted therebetween, while the control port and the back-flow port are blocked therebetween, so that the fluid enters from the source port to the chamber, and is input from the control port; when the movable member is located in the second position, the source port and the control port are blocked therebetween, while the control port and the back-flow port are conducted therebetween, so that the fluid flows back to the fluid source through the control port and the back-flow port.

It should be noted that, FIG. 1 and FIG. 2 are merely diagrams illustrating relationships between some components in the micro valve devices 1 and 2, rather than structural diagrams of the micro valve devices. In a case where independent control of different control ports of the micro valve device can be achieved, the main body, the fluid port, the movable member and the actuator having all kinds of suitable structures can be used, according to the embodiment of the present invention. Some exemplary structures according to the embodiment of the present disclosure will be described in the embodiments below.

A mode in which the movable member controls the conduction and the blocking between the control port and the source port, or a mode in which it controls the conduction and the blocking between the control port and the back-flow port is not specifically limited. For example, the movable member can achieve the above-described control by switching between the two states of covering and not covering the fluid port, or can block the fluid communication between the ports by setting a mode of blocking a chamber portion between the ports, and conducts the fluid path between the ports when the movable member is moved away from the above-described position.

In one example, the movable member may move in a mode perpendicular to a surface of the main body of the micro valve device (the surface of the base layer or the cover layer) (a mode of longitudinal movement). In the mode of longitudinal movement, upon the control port being blocked, the port is covered by the movable member (or the actuator itself); upon the control port and the source port are conducted, the movable member keeps a certain distance from the port in a direction perpendicular to the surface of the main body of the micro valve device, so as to leave a gap for the fluid to flow. For example, in a case where the actuator is the piezoelectric actuator, in the mode of longitudinal movement, different film electrodes of the piezoelectric actuator are stacked along the direction perpendicular to the surface of the main body of the micro valve device, so the piezoelectric actuator can move in a longitudinal direction, when an electric signal is applied to an electrode layer of the piezoelectric actuator. In addition, the present invention further provides a structure applicable to a mode of movement parallel to the surface of the main body of the micro valve device, the mode of movement or the structure can achieve a technical effect better than that of the above-described mode of longitudinal movement, and this structure and its related technical effect will be described in detail in the embodiment below.

Embodiment 2

Figure 3:
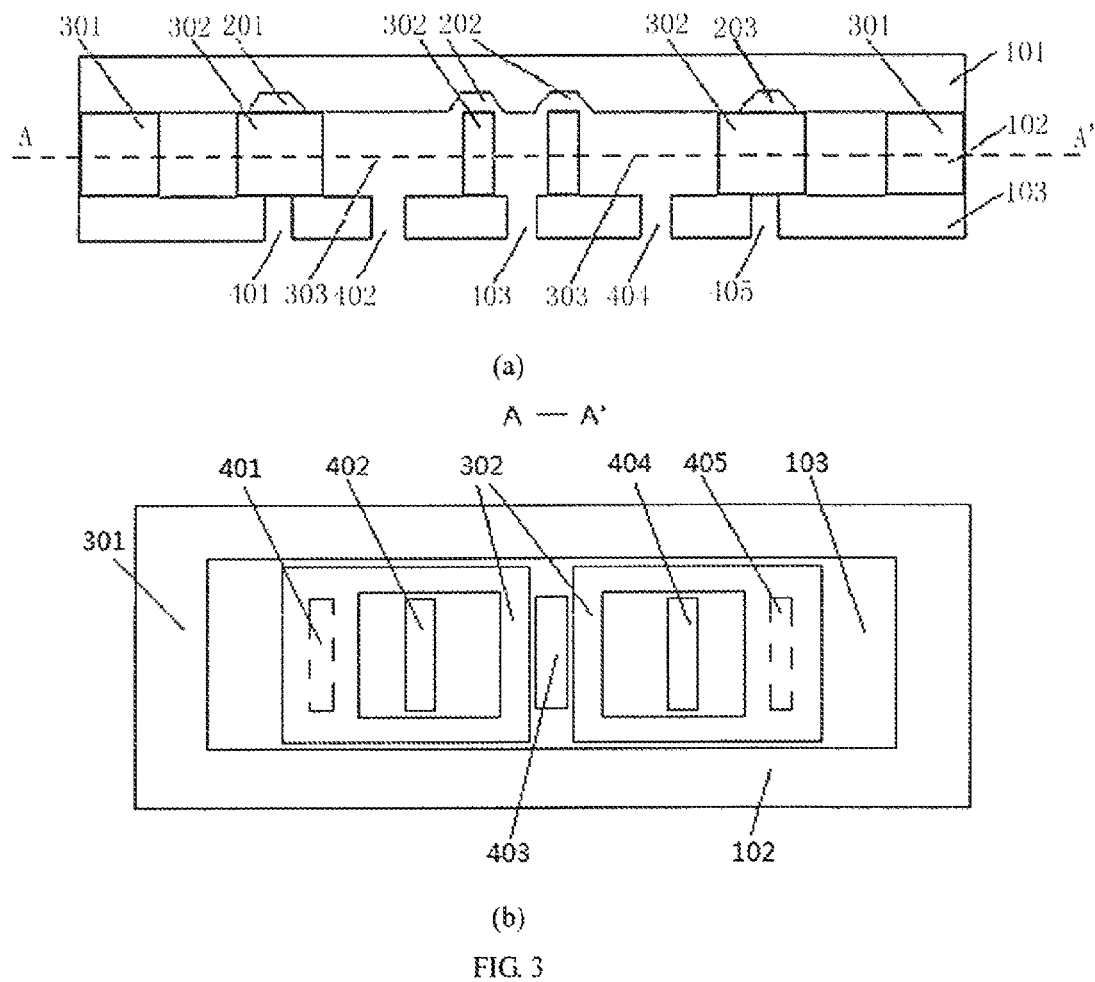
FIG. 3 is a structural schematic diagram of a micro valve device according to an embodiment of the present disclosure.

FIG. 3 illustrates a structure of a micro valve device according to the embodiment of the present disclosure, wherein (a) is a cross-sectional schematic diagram; while (b) is a plan schematic diagram. In addition, it should be noted that, this embodiment is another specific example according to the present disclosure, and the features described in the above-described Embodiment 1 are also applicable to this embodiment or may be appropriately combined with this embodiment. For simplicity of description, contents the same as those in the above-described Embodiment 1 will be appropriately simplified or omitted in this embodiment.

As illustrated in FIG. 3(a) and FIG. 3(b), the micro valve device comprises a cover layer 101, an intermediate layer 102 and a base layer 103. The cover layer 101, the intermediate layer 102 and the base layer 103 stacked sequentially form a main body of the micro valve device. The intermediate layer 102 may be of a frame-shaped structure, so as to define a chamber 303 within the main body of the micro valve device.

As illustrated in FIG. 3, an inner surface (a surface facing the chamber 303) of the cover layer 101 includes thereon a plurality of recesses 201, 202 and 203 (functions of the respective recesses will be described later on). In addition, the chamber of the main body of the micro valve device further includes two movable members 302 therein, e.g., the movable members 302 can slide within the chamber on a plane parallel to the cover layer 101 or the base layer 103. The base layer 103 includes a first source port 401, a second source port 405, a first control port 402, a second control port 404 and a common back-flow port 403. The first source port 401 and the first control port 402 constitute a first source port/control port pair, and the second source port 405 and the second control port 404 constitute a second source port/control port pair.

For each source port/control port pair, the source port can be communicated with a fluid source, and the control port can be communicated with a control object (e.g., a main valve, etc.), so as to apply a desired fluid pressure to the control object, etc. In addition, upon the pressure being unloaded or adjusted, the fluid applied may then flow back to the fluid source through the control port and then through the back-flow port. Thus, the back-flow port may also be communicated with the fluid source.

For the movable member 302 in this embodiment, it can move (e.g., between a first position and a second position), so as to independently control each source port/control port pair. For example, upon the movable member being located in the first position, the source port and the control port in the corresponding source port/control port pair can be in fluid communication through at least a portion of the chamber 303, so the fluid applied by the fluid source can be output through the control port; and upon the movable member being located in the second position, a fluid path between the source port and the control port in the corresponding source port/control port pair is blocked by the movable member 302, so that fluid output from the control port is stopped, at which time, the control port and the back-flow port can be conducted therebetween, so that the fluid previously output by the control port can flow back to the fluid source through the control port and the back-flow port again.

For each movable member 302, it can be driven by a separate actuator (not illustrated in the diagram), so as to independently control conduction and blocking between each control port and the source port.

In one example, both ends of the actuator may be connected with the intermediate layer 102 and the movable member 302, respectively. For example, a portion of the intermediate layer 102 for connecting with one end of the actuator may be referred to as a fixed anchor region 301. Since the intermediate layer 102 is tightly bonded to or integrally formed with the cover layer 101 and/or the base layer 103, it can be used as the fixed anchor region 301 for the actuator. Of course, the fixed anchor region 301 used for the actuator may also be formed by other layers independent of the frame-based intermediate layer 102, which is not specifically limited by the embodiment of the present disclosure.

The intermediate layer 102 is tightly bonded to the cover layer 101 and the base layer 103, or just one of them by using a wafer bonding method (including but not limited to, fusion bonding, anodic bonding, silicon-gold bonding, adhesive bonding and other methods). The movable member 302 and the actuator (e.g., an elastic suspension beam structure) are movably suspended in midair, and in close contact with neither the cover layer 101 nor the base layer 103; the actuator can drive the movable member 302 to rapidly move within the chamber 303, e.g., at a predetermined frequency, so that the source port/control port pair rapidly switches between the conducting state and the blocking state, so as to accurately control flow rates and pressures of the fluid output through the control port.

In the embodiment of the present disclosure, the two movable members 302 respectively control a first source port/control port pair and a second source port/control port pair (one movable member corresponds to the first source port/control port pair, and the other movable member corresponds to the second source port/control port pair), so the conducting state and the blocking state of the two source port/control port pairs can be controlled independently, so that the flow rates and the pressures of the fluid output through each control port can be separately controlled. In this case, the fluid of the same or different flow rate(s) or pressure(s) can be output.

Under a condition that independent control of different control ports is achieved, specific forms of the source port, the control port, the back-flow port, and the movable member according to the embodiment of the present disclosure are not specifically limited.

For example, in one example, as illustrated in FIG. 3, the first source port 401, the first control port 402, the back-flow port 403, the second control port 404 and the second source port 405 are formed in the base layer 103 and run through the base layer 103. The above-described ports 401, 402, 403, 404 and 405 are arranged sequentially from left to right in FIG. 3. The back-flow port 403 is shared by the two source port/control port pairs. In regions corresponding to both sides of the back-flow port 403, an inner surface of the cover layer 101 includes two communicating recesses 202.

Figure 4:
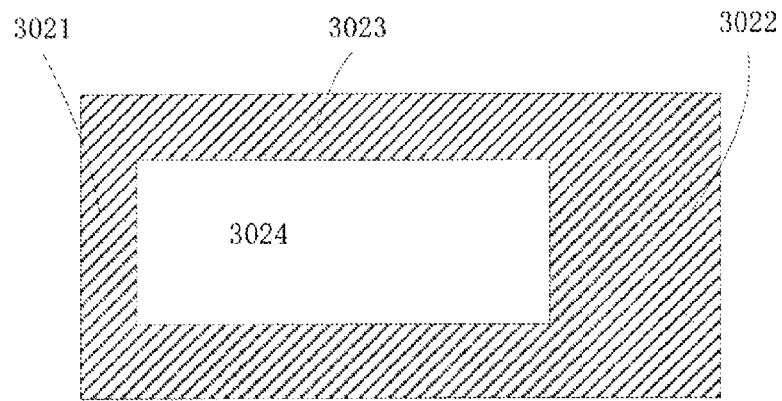
FIG. 4 is a plan schematic diagram of a movable member in a micro valve device according to an embodiment of the present disclosure.

FIG. 4 illustrates a plan view of a movable member 302 (the movable member in the right half of FIG. 3). As illustrated in FIG. 4, each movable member 302 includes a first portion 3021 for controlling the conducting state or the blocking state between the back-flow port 403 and the control port 404, and a second portion 3022 for controlling the conducting state or the blocking state between the control port 404 and the source port 405. In addition, each movable member 302 may further include a connecting portion 3023 for connecting the first portion 3021 and the second portion 3022 to form a frame form. The movable member in the frame form cooperates with the base layer 103 and the cover layer 101 so as to define a sub-chamber within the chamber. The movable member 302 is placed within the chamber of the main body of the micro valve device, has a thickness substantially the same as a thickness of the intermediate layer 102, and can slide within the chamber 303. FIG. 4 merely illustrates the movable members of the control ports 403, 404 and 405. Since the ports 401 and 402 are arranged symmetrically with the ports 405 and 404 with respect to a centerline of the micro valve device, the movable member 302 for controlling the ports 401, 402 and 403 may be arranged symmetrically with the movable member illustrated in FIG. 4 with respect to the centerline of the micro valve device, which will not be repeated here.

In one example, as illustrated in FIG. 3, buffer recesses 201 and 203 may be further disposed on the inner surface of the cover layer 101, in regions corresponding to the source ports 401 and 405, which can reduce impact of the fluid flowing from the fluid source to the chamber of the micro valve device through the source port.

Figure 5:
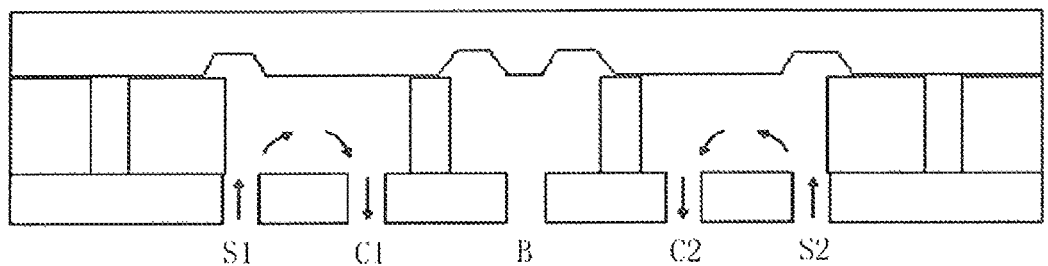
FIG. 5 is a schematic diagram of a working principle of a micro valve device according to an embodiment of the present disclosure.
Figure 5:
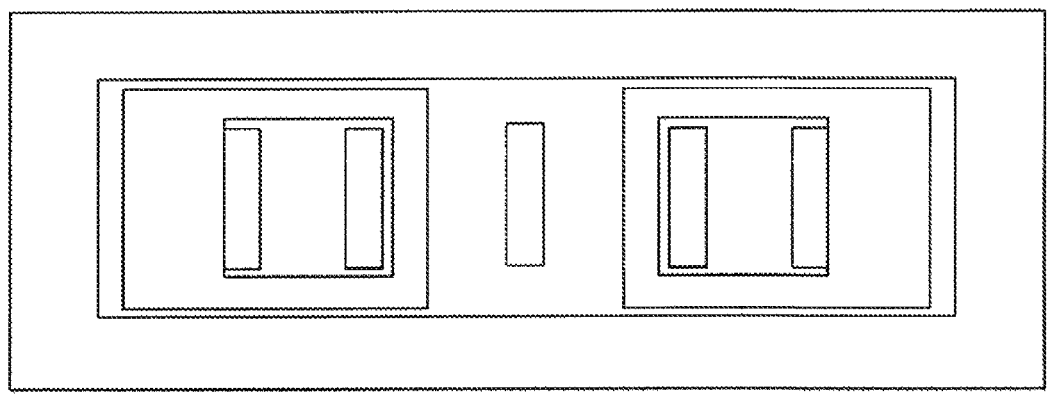
Figure 5:
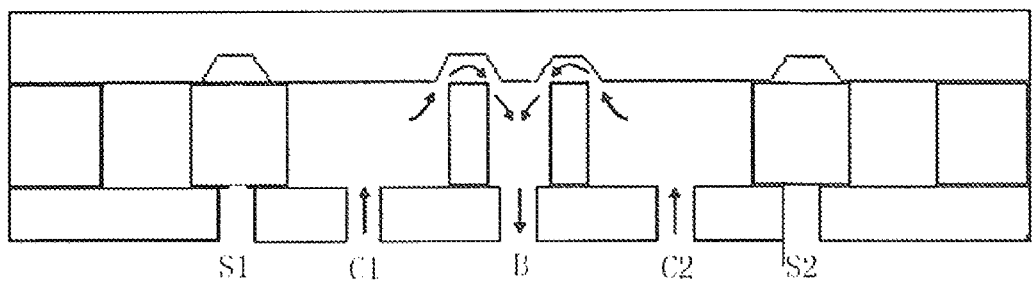
Figure 5:
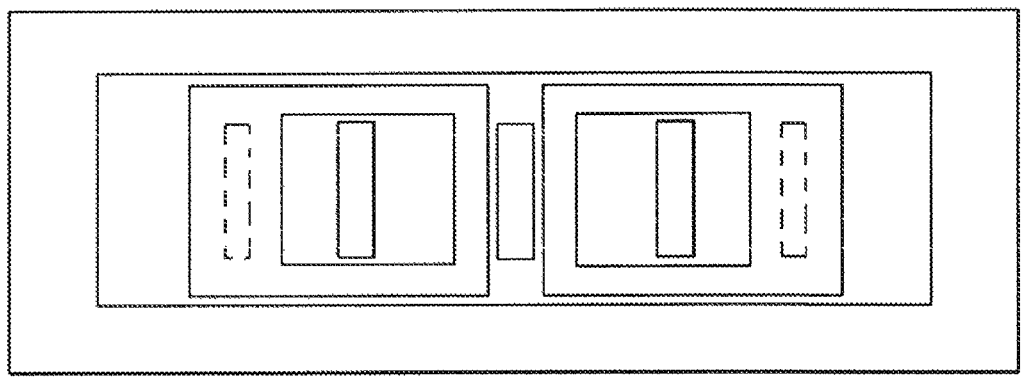

Hereinafter, a basic working principle of the micro valve device having the structures according the above-described examples will be illustrated in conjunction with FIG. 5. FIG. 5 illustrates two types of working modes of the micro valve device. FIG. 5(a) is a pressurization mode; and FIG. 5(b) is a back-flow mode, wherein both (a) and (b) in FIG. 5 illustrate a cross-sectional view and a plan view; and for simplicity and clarity of illustration, reference signs of respective components are omitted, only using S1 and S2 to denote the source ports, C1 and C2 to denote the control ports, and B to denote the back-flow port. Upon the movable member 302 moving to the position (the first position) illustrated in FIG. 5(a), the control port C1 is in fluid communication with the source port S1 through a portion of the chamber 303, and the control port C2 is in fluid communication with the source port S2 through a portion of the chamber 303. Thus, the fluid having a certain pressure flows in through the source ports S1 and S2, and is output through the control ports C1 and C2, and the micro valve device works in the pressurization mode. Upon the movable member 302 moving to the position (the second position) illustrated in FIG. 5(b), the fluid flowing in through the source ports S1 and S2 is isolated, and the fluid of the control ports C1 and C2 is drained by the common back-flow port B, and the micro valve device works in the back-flow mode. Although both FIG. 5(a) and FIG. 5(b) illustrates examples that the two control ports are simultaneously in the pressurization mode or the back-flow mode, yet the two control ports according to the embodiment of the present disclosure can be independently driven by their respective movable members, so there may be a case where one control port is in the pressurization mode, while the other control port is in the back-flow mode.

More specifically, for the micro valve device having the structures according to the above-described examples, upon the movable member 302 being located in the first position, as illustrated in FIG. 5(a), the second portion 3022 of the movable member 302 is located outside the source ports S1 and S2, while the first portion 3021 is located between the control port and the communicating recesses on both sides of the back-flow port, so that the source port is in fluid communication with the control port. In other words, the corresponding control port and the source port are simultaneously located in a region of the sub-chamber formed by the movable member of frame structure, so that the corresponding control port is in fluid communication with the source port through the sub-chamber. Upon the movable member 302 being located in the second position, as illustrated in FIG. 5(b), the first portion of the movable member 302 covers the source port, so as to block influx of the fluid from the source port, and the second portion is located below the communicating recesses on both sides of the back-flow port; since a width of the communicating recess is greater than a width of the second portion, the control port can be in fluid communication with the back-flow port through a gap between the movable member 302 and the communicating recess.

A left portion and a right portion of the micro valve device illustrated in the diagram are respectively driven by two separate actuators; if high-frequency signals having different duty ratios are applied to the two actuators, then the control port C1 and the control port C2 output two types of fluids having different flow rates and pressures, and an output pressure difference between the two control ports is adjustable. If an identical signal is applied to the two actuators, then the first control port C1 and the second control port C2 output two paths of isobaric fluid signals. Based on the above-described working principle, the embodiment of the present disclosure can achieve a completely controllable micro valve device which can output the pressure difference or the isobaric fluid signal.

As mentioned in the above Embodiment 1, the movable member of the micro valve device according to the embodiment of the present disclosure can move in a longitudinal direction, i.e., move perpendicular to surfaces of respective layers of the main body of the micro valve device, so as to achieve control of the fluid communication between the respective fluid ports. As illustrated in the embodiments illustrated with reference to FIG. 3-FIG. 5, the embodiment of the present disclosure further provides a mode of lateral movement, that is to say, the control of the conducting state and the blocking state between the source port, the control port and the back-flow port can be achieved by the lateral movement (movement in a direction parallel to the plane of the cover layer and/or the base layer of the micro valve device) of the movable member. In such a case, the actuator needs to provide a drive in a lateral direction. In a process of driving the movable member, the movable member is driven by using an output displacement generated by the lateral expansion and contraction of the actuator, so as to control an open area of the respective fluid ports. Such a design in which the movable member is driven laterally by the actuator may have advantages as follows: since the output displacement of the actuator is limited, the flow area can be increased by enlarging a length of the fluid port upon the actuator expanding and contracting laterally. Therefore, when the fluid flows through the respective ports according to control logic, the flow area and the flow rate are effectively expanded, so as to avoid rapid pressure drop, and fully meet application requirements of refrigeration and other industries. In addition, upon the port being in an opening state, such a design avoids direct pressure impact of the fluid on the actuator. For example, in a case where the actuator is a stacked piezoelectric actuator, a stacking direction of different film electrodes in the stacked piezoelectric actuator can be a direction parallel to the plane of the base layer, that is to say, different film electrodes in the stacked piezoelectric actuator may be alternately stacked along the direction parallel to the plane of the base layer.

Further, it should be noted that, the movement mode of the movable member is not merely limited to the mode of longitudinal movement and the mode of lateral movement as described above; and in a case where the fluid communication between the respective ports can be controlled, any other suitable movement mode can be used. Besides, types of the actuator driving the movable member in various movement modes are not specifically limited either, as described above in Example 1.

The above examples describe the case where two source port/control port pairs share one back-flow port, and the communicating recesses are respectively disposed on both sides of the back-flow port. However, the number of the back-flow port can be set to be greater than one. For example, each source port/control port pair is configured with one back-flow port. In this case, it is not necessary to set the communicating recess. For example, when the back-flow mode is needed, the back-flow port and the control port may be located in the sub-chamber constituted by the movable member, so that the back-flow port is in fluid communication with the control port. In addition, an arrangement order of the source port, the control port and back-flow port is not limited to the order illustrated in the diagram, according to the embodiment of the present disclosure; instead, various suitable arrangement orders can be used, as long as different control ports can be independently driven to output fluids with the same or different flow rate(s) and pressure(s). The ports of the base layer in the above-described embodiments are arranged in parallel. These ports and the movable member can also be arranged in other forms, with configurations and logical relationships thereof unchanged.

Embodiment 3

An embodiment of the present disclosure further provides a valve body assembly comprising a micro valve device and a main valve. FIG. 3 is a schematic diagram of the valve body assembly according to one embodiment of the present disclosure. Hereinafter, a structure of the valve body assembly according to the embodiment of the present disclosure and a principle on which the micro valve device controls the main valve are described in conjunction with FIG. 3.

Figure 6:
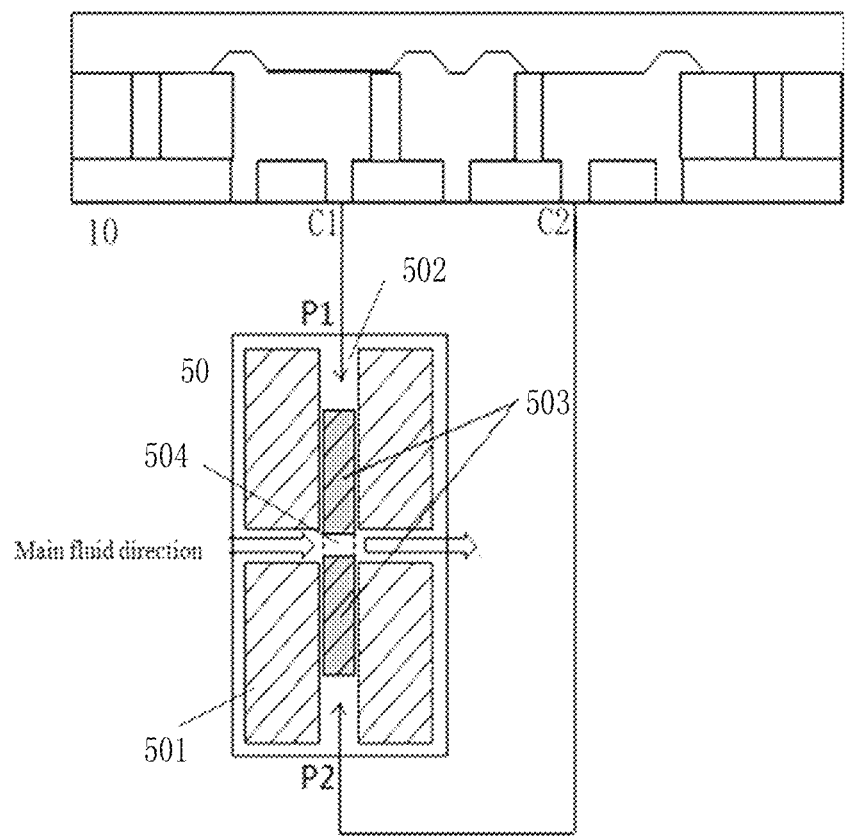
FIG. 6 is a structural schematic diagram of a valve body assembly according to an embodiment of the present disclosure.

The micro valve device 10 in the valve body assembly according to this embodiment may be the micro valve device according to any one of the above-described embodiments, and structures of the micro valve device will not be repeated here. In addition, the main valve 50 of the valve body assembly is not specifically limited by the embodiment of the present disclosure either. For example, the main valve 50 may have a main body 501 of the main valve and a valve core 503, the main body 501 of the main valve has therein a main fluid channel running through the main body of the main valve along a first direction (an arrow direction illustrated by a main fluid direction in FIG. 6) and a slide channel 502 extending along a direction crossing the first direction (the direction illustrated by FIG. 6 is a direction substantially perpendicular to the first direction, but the present invention is not limited thereto), and the valve core 503 may have therein a via hole 504. The via hole 504 may run through the valve core 503 along a direction parallel to the first direction. The valve core 503 can slide in the slide channel 502 of the main body 501 of the main valve, and the main fluid channel is opened upon the via hole 504 of the valve core 503 being aligned with the main fluid channel in the main body 501 of the main valve; and the main fluid channel is cut off upon the via hole 504 of the valve core 503 and the main fluid channel in the main body 501 of the main valve are staggered.

As illustrated in FIG. 6, a first control port C1 of the micro valve device is communicated with a P1 end of the slide channel of the main valve, and a second control port C2 of the micro valve device is communicated with a P2 end of the slide channel of the main valve. When the micro valve device 10 works as a pilot valve, the first control port C1 and the second control port C2 respectively output two paths of fluid signals to be applied to the P1 end and the P2 end of the main valve 50. When a sum of a fluid pressure of the P1 end and a gravity of the valve core 503 is higher than a fluid pressure of the P2 end, the valve core 503 moves downward; when the sum of the fluid pressure of the P1 end and the gravity of the valve core is lower than the fluid pressure of the P2 end, the valve core 503 moves upward; and when the sum of the fluid pressure of the P1 end and the gravity of the valve core is equal to the fluid pressure of the P2 end, the valve core 503 can hover statically. There is a via hole 504 communicating left to right in a middle part of the valve core 503. As illustrated in FIG. 6, the main fluid channel is opened and the main fluid flows, when the valve core 503 moves to a position where the via hole 504 is aligned with the main fluid channel; and the main fluid channel is closed and the main fluid is cut off, when the valve core 503 moves to other positions. Thus, the micro valve device 10, serving as the pilot valve, controls the main valve 50, and can achieve a function of controlling opening and closing of the main valve. Moreover, a volume of the flow rate of the main fluid may be further controlled according to a degree of superposition between the main fluid channel of the main body 501 of the main valve and the via hole 504 of the valve core 503.

Although the main valve in FIG. 6 is placed vertically, yet the embodiment of the present disclosure is not limited thereto. The main valve in the valve body assembly according to the embodiment of the present disclosure may be placed horizontally or in any other direction. When the main valve is placed in other modes, a control method is that same as that in the embodiment as illustrated in FIG. 6, which will not be repeated here.

The slide channel of the main valve has smooth side walls, so that the valve core can slide in the slide channel very sensitively. Given that the pressures in the P1 end and the P2 end are adjustable, displacement of the valve core in the slide channel depends on a resolution of pressure adjustment in the P1 end and the P2 end, so valve core displacement control of a high sensitivity can be achieved. The micro valve device, serving as a pilot valve, controls the main valve, and can achieve a proportional adjustment of the flow rate of the main fluid, according to an area in which the valve core is communicated and aligned with the fluid channel of the main valve.

Due to characteristics of silicon micromechanical structure, the micro valve device involved in the present disclosure has a relatively high action frequency and a rapid action response. In addition, the device itself only consumes little energy, and thus has lower power consumption.

It should be noted that, the micro valve device involved in the present disclosure can work in an open-loop mode and a closed-loop mode. The flow rate and the pressure of the fluid generated by the control port is converted into an electrical signal, which, as a feedback signal, is provided to a mechanism generating a driving electrical signal, and closed-loop adjustment and control may be achieved, and the micro valve device works in the closed-loop mode. Conversely, if the feedback path is in a disconnected state, the micro valve device works in the open-loop mode.

The micro valve device according to the embodiment of the present disclosure may be fabricated based on a MEMS fabrication technology. For example, the intermediate layer may be made of a silicon material, and the cover layer and the base layer may be made of the silicon material or borosilicate glass. Further, although only two control ports are illustrated in the embodiments of FIG. 3-FIG. 5, yet embodiments of the present disclosure may include more than two control ports, and at least two control ports can be controlled independently.

In addition, in the micro valve device according the embodiment of the present disclosure, the movable member 302 may include one or more via holes. For example, the second portion 3022 may have a via hole. When the movable member 302 is located in the second position (the source port and the control port being blocked therebetween), the via hole may be aligned with buffer recesses 201 or 203. In addition, those skilled in the art can set sizes of respective portions of the movable member 302 according to actual needs. For example, in order that the second portion 3022 of the movable member 302 can block the communication between the source port and the control port by covering the source port, a size of the second portion 3022 needs to be greater than that of the source port. However, when they are blocked in other modes, for example, in a case where the second portion 3022 moves to the right side of the source port S1 or the left side of the source port S2 in FIG. 5($b$), the above-described dimensional relationship may not be used.

Further, it should be noted that, the movable member for controlling the respective control ports can be driven by the actuator. Alternatively, the movable member itself is the actuator or a portion of the actuator, which will not be specifically limited by the embodiment of the present disclosure.

The foregoing embodiments merely are exemplary embodiments of the invention, and not intended to define the scope of the invention, and the scope of the invention is determined by the appended claims.

What is claimed is:

1. A micro valve device, comprising:
a main body, defining a chamber, the main body having a source port and at least two control ports which are in communication with the chamber;
at least two movable members, the at least two movable members independently controlling conduction or blocking between each of the at least two control ports and the source port by switching between a first position and a second position, respectively,
wherein, upon each movable member being located in the first position, a corresponding control port is in fluid communication with the source port through at least a portion of the chamber; and upon each movable member being located in the second position, a fluid path between the corresponding control port and the source port is blocked by the movable member,
wherein the at least two movable members are independently movable with respect to each other.

2. The micro valve device according to claim 1, wherein the main body includes a base layer, an intermediate layer and a cover layer stacked sequentially, wherein the intermediate layer is of a frame structure, so as to define the chamber with the base layer and the cover layer.

3. The micro valve device according to claim 2, wherein the source port and the at least two control ports are located in the base layer.

4. The micro valve device according to claim 2, wherein a thickness of each movable member along a direction perpendicular to a surface of the base layer or the cover layer is substantially the same as a thickness of the intermediate layer.

5. The micro valve device according to claim 2, further comprising an actuator for independently controlling each of the at least two movable members, so that each of the at least two movable members is located in the first position or the second position.

6. The micro valve device according to claim 5, wherein one end of the actuator is fixed onto the intermediate layer, and the other end of the actuator is connected with the each of the at least two movable members, to drive the each of the at least two movable members to slide within the chamber along a direction parallel to a surface of the base layer or the cover layer.

7. The micro valve device according to claim 5, wherein the actuator is a piezoelectric actuator including a plurality of film electrodes, the film electrodes being stacked along the direction parallel to a surface of the base layer or the cover layer.

8. The micro valve device according to any claim 2, wherein at least one of the cover layer and the base layer is tightly bonded to or integrally formed with the intermediate layer.

9. The micro valve device according to claim 2, wherein the intermediate layer is made of a silicon material; and the cover layer and the base layer are made of the silicon material or borosilicate glass.

10. The micro valve device according to claim 2, wherein the main body further includes at least one back-flow port, and upon each of the two movable members being located in the second position, the corresponding control port is in fluid communication with the at least one back-flow port through at least a portion of the chamber.

11. The micro valve device according to claim 10, wherein, the back-flow port is located in the base layer.

12. The micro valve device according to claim 10, wherein each movable member includes a first portion disposed between the corresponding control port and the back-flow port, for conducting or blocking fluid communication between the corresponding control port and the back-flow port; a second portion close to the source port, for conducting or blocking fluid communication between the corresponding control port and the source port; and a connecting portion for connecting two ends of the first portion and the second portion to constitute a frame form, and
wherein each movable member in the frame form cooperates with the base layer and the cover layer so as to define a sub-chamber within the chamber.

13. The micro valve device according to claim 12, wherein upon each movable member being located in the first position, the corresponding control port and the source port are located within a region corresponding to the sub-chamber, so that the corresponding control port is in fluid communication with the source port through the sub-chamber.

14. The micro valve device according to claim 12, wherein on two sides of the back-flow port in a direction from the first position to the second position, there is a communicating recess on an inner surface of the cover layer, upon each movable member being located in the second position, the first portion of the each movable member is located in a position corresponding to the communicating recess, and the corresponding control port is in fluid communication with the back-flow port through a gap between the first portion of the each movable member and the communicating recess.

15. The micro valve device according to claim 14, wherein there is a buffer recess on the inner surface of the cover layer in a region corresponding to the source port.

16. The micro valve device according to claim 1, wherein the at least two control ports output fluids having different flow rates and pressures, by independently controlling movement of each of the at least two movable members.

17. The micro valve device according to claim 1, wherein each control port is configured with one source port, to form a source port/control port pair, wherein upon each movable member being located in the first position, the source port and the control port in the corresponding source port/control port pair are conducted therebetween; and upon each movable member being located in the second position, the source port and the control port in the corresponding source port/control port pair are blocked therebetween.

18. The micro valve device according to claim 1, wherein the main body has two control ports.

19. A valve body assembly, comprising:
the micro valve device according to claim 1; and
a main valve, including a main body of the main valve and a valve core, the main body of the main valve having therein a main fluid channel running through the main body of the main valve along a first direction and a slide channel extending along a direction crossing the first direction, the valve core having therein a via hole running through the valve core along a direction parallel to the first direction, the valve core being disposed in the slide channel of the main body,
wherein one control port of the micro valve device is communicated with a first end of the slide channel, and the other control port in the micro valve device is communicated with a second end of the slide channel opposite to the first end, so as to drive the valve core to move in the slide channel.

20. The valve body assembly according to claim 19, wherein the main fluid channel is opened upon the valve core being driven so that the via hole is aligned with the main fluid channel; and the main fluid channel is cut off upon the valve core being driven so that the via hole and the main fluid channel are staggered.

\* \* \* \* \*